May 14, 1946. H. R. DALTON 2,400,292

CRYSTALLINE PELLETS AND METHOD OF PREPARATION

Filed Dec. 23, 1941 2 Sheets-Sheet 1

INVENTOR
HAROLD R. DALTON
BY John J. Rogan
ATTORNEY

May 14, 1946. H. R. DALTON 2,400,292
CRYSTALLINE PELLETS AND METHOD OF PREPARATION
Filed Dec. 23, 1941 2 Sheets-Sheet 2
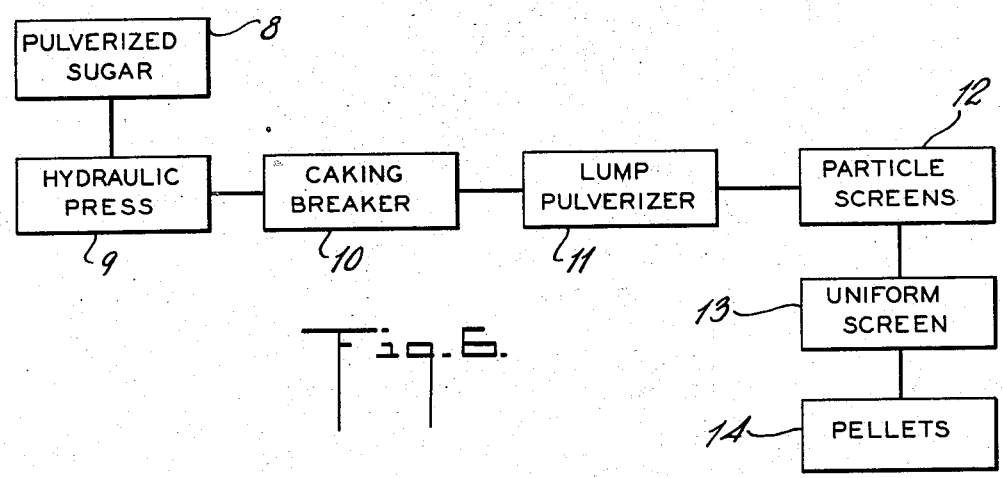
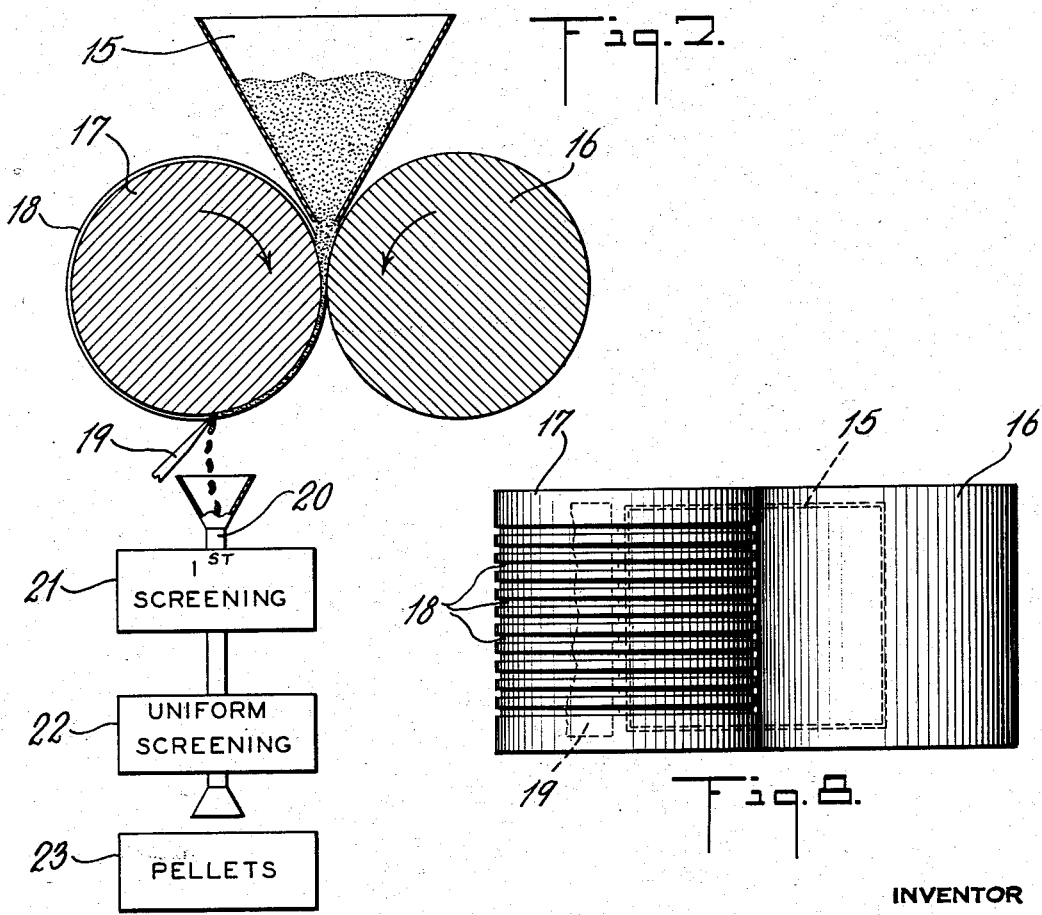
INVENTOR
HAROLD R. DALTON
BY John J. Logan
ATTORNEY Patented May 14, 1946

2,400,292

UNITED STATES PATENT OFFICE 2,400,292

CRYSTALLINE PELLETS AND METHOD OF PREPARATION

Harold R. Dalton, Teaneck, N. J.

Application December 23, 1941, Serial No. 424,094

6 Claims. (Cl. 127—30)

This invention relates to food or edible products and with particularity it relates to such products which are handled or transported in a comminuted or powdered form and are slightly hygroscopic. As examples of such products may be mentioned, sugar, gelatin and similar dessert powders, malted milk powders, flavoring powders, medicinal powders and the like. Merely for purposes of explanation, the ensuing description will refer to sugar as typical, but it is understood that the invention is equally well applicable to a wide variety of other edible products.

Heretofore, sugar crystals and many other food products when ground to a very finely divided state, cause considerable difficulty in shipping, storing and handling, by reason of the tendency of the comminuted crystals to become caked. In some cases, this caking assumes a hard, glassy or rock-like consistency, rendering it very difficult or practically impossible to break into its original comminuted crystal fragment form.

Accordingly, it is a further object of this invention to provide a very finely comminuted or powdered material such as sugar and the like which is singularly free from caking tendencies.

For certain purposes, solid sugars may be grouped into three general classes, namely powdered sugar, granulated sugars and transformed or amorphous sugars. While all three groups possess the tendency to cake, the granulated sugars are relatively easily redispersed or broken up into their original crystalline form. Sugar being slightly hygroscopic will absorb a certain amount of water from the air when the relative humidity is high, and when the relative humidity drops, it will again give up to the air this absorbed water. The absorbed water dissolves some of the sugar on the surface of the crystals and forms an extremely thin film of syrup. When the water is given up to the air again, crystallization takes place in the syrupy film, and if a large number of crystals happen to be in close contact as they would normally be in a box or bag, they become fused or cemented together during this surface crystallization process. In the case of large crystal sugars such as those manufactured under the name "granulated sugar," the caked or fused masses can be dispersed or separated mechanically because the points of contact are few and therefore the inter-crystalline bonding forces are comparatively weak. On the other hand, with powdered sugars the particles of extremely fine crystal or crystal fragments come in close contact with one another, and because of their numerous points of surface contact, the bonding or fusing caused by the crystallization of the syrupy coating above mentioned, is strong enough so that redispersion or separation into the original fine components or particles is difficult or practically impossible.

Accordingly, it is another principal object of the invention to provide sugars of the very finely powdered type wherein the fine components exist as individually compacted groups to provide a free flowing sugar, but which groups can be easily redispersed mechanically into their individual components or fragments.

Another object is to provide a free-flowing sugar of the soft or of the transformed or amorphous types which sugar is also substantially free from undesirable caking.

Another object is to provide a finely comminuted food product such as sugar, in the form of round or similar smoothly contoured pellets of substantially uniform density with the individual particles of each pellet held together substantially entirely by mechanical inter-particle cohesion, as distinguished from fusion or cementing. The pellets are prepared so that this cohesive force is sufficient to retain the pellets in their compacted form during normal shipping, storing and handling, but is not strong enough to prevent the particles of each pellet being separated by ordinary pressures. As a result of the pellet particles being held together solely by mechanical cohesive forces, the rapidity of solution of the pellets is increased as compared with particles which are held together by fusion or cementing such as above described.

Another object is to provide a very fine powdered sugar which is less subject to moisture absorption, as a result of restricted moisture vapor flow from the air through the body of the sugar during shipping, handling, storing, etc.

A feature of the invention relates to a sugar or food material composed of pulverized sugar particles mechanically compacted into the form of particle groups, forming pellets of substantially spherical or similar smoothly rounded contour, the pellets being of about 0.3 mm. to 1.5 mm. average diameter, but of a density such that they may be easily broken by pressure or rubbing motion into the original particles. The pellets however, possess sufficient firmness to withstand shipping, handling and storing without disintegration of the pellets.

Another feature relates to an improved powdered sugar which is intended for use in making fondants, icings and the like.

A further feature relates to an improved process of forming finely powdered sugar into mechanically compacted and smoothly contoured pellets of the order of 0.3 mm. to 1.5 mm. average diameter.

A further feature relates to the novel organization and succession of steps constituting an improved method of preparing a free-flowing non-caking, soft, or transformed sugar.

Other features and advantages not specifically enumerated will be apparent after a consideration of the following detailed descriptions and the appended claims.

In the drawings which are explanatory and illustrative of certain forms of apparatus for practicing the invention and of a product thereof, Fig. 1 is a greatly magnified view of the novel powdered sugar pellet according to the invention.

Figs. 5, 6 and 7 are diagrammatic views explanatory of different processes of preparing the sugar according to the invention.

Fig. 8 is a top-plan view of part of the apparatus shown in Fig. 7.

While a sugar prepared according to the invention will find a wide variety of uses in the food industries, for purposes of explaining the invention its adaptation to the making of fondants or icings will be chosen as illustrative. In the manufacture of fondants, it is customary to use granulated sugar as distinguished from very finely comminuted or powdered sugar. The present known method requires dissolving the granulated sugar to form a syrup and doing mechanical work on the syrup to produce very fine crystals of sugar. Thus in making candy mint patties, cake icings or the like, it is highly desirable that the finished product have a smooth surface, uniform texture and be free from gritty particles. The finely comminuted sugar that has been recently introduced to simplify the above-mentioned process has, during storing, handling and transportation, a decided tendency to cake and form unitary lumps of finely crystallized sugar as above described. Because of the highly irregular character of the individual particles of the lump and their fused or cemented nature, it is often not possible for the user to employ the sugar directly in making the fondant so that it requires a manual breaking of the caked masses. However, even after this manual breaking there may remain a comparatively high percent of hard rough surfaced agglomerates of the powdered sugar crystals. These qualities of hardness and rough surface contour undesirably affect the palatability and appearance of the finished fondant or icing. Prior to the present invention, it has not been possible to prevent caking of the finely powdered sugar during shipping, storing or handling. Compromise solutions have been offered involving the addition of such extraneous materials as starch, calcium phosphate, etc. These materials do not entirely prevent caking and may render the powdered sugar worthless for certain uses, and in certain jurisdictions the addition of such materials is prohibited. The powdered sugar prepared according to this invention, is not only free flowing and substantially free from sugar dust and caking, but is also easily broken down into substantially uniform and fine particles.

Figure 1:
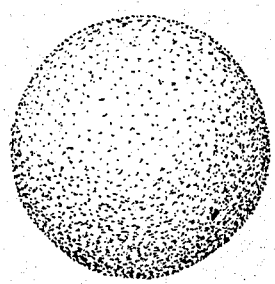
Figure 2:
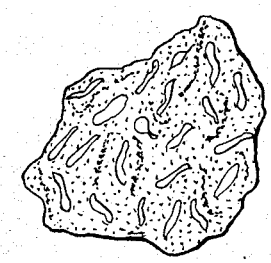
Fig. 2 is a greatly magnified view of a caked mass of transformed sugar particles or powdered sugar crystal fragments for comparison with the pellet of Fig. 1.

In accordance with the invention, the finely powdered slightly hygroscopic substance in the form of minute crystals or crystal fragments is compressed or otherwise consolidated into tiny particles of spherical or smoothly contoured formation having substantially uniform density. These rounded particles are preferably of substantially uniform size and with a density greater than the apparent density of an equivalent mass of the original powder. Such a compacted powder will be referred to herein as a pellet and a typical magnified view thereof is shown in Fig. 1 wherein it can be seen that the pellet which is of from 0.3 to 1.5 mm. average diameter, is constituted of a great number of fine sugar particles which have been compacted without fusion or cementing to reduce to a minimum the percentage of inter-particle air space. As an example, the individual particles constituting the pellets may be of a fineness of the order of 25 microns such as is ordinarily found in powdered sugars. The pellet has a spherical or smoothly rounded contour and this shape is maintained substantially entirely by the mechanical force of cohesion which exists between the compacted particles. The force is chosen so that the pellet retains its organization during normal shipping, storing and handling, but it can be broken down into its fine powder form by a relatively light crushing or rubbing force, the order of which can be adjusted to meet consumer or other demands. For purposes of comparison, there is shown in Fig. 2 a typical caked powdered sugar mass of about the same exterior dimensions as the pellet of Fig. 1. An examination of the two figures will show that the percent of air space to crystal body in Fig. 1 is much greater than in the case of Fig. 2.

Furthermore, because of the fusion or cementing of the fragments of Fig. 2 as a result of the absorption of moisture, it is practically impossible for the user to disintegrate the mass of Fig. 2 into any finer components. Furthermore, the external surface of such a mass is rough and jagged, and for these reasons it is useless in such applications as fondants, icings and the like.

Figure 3:
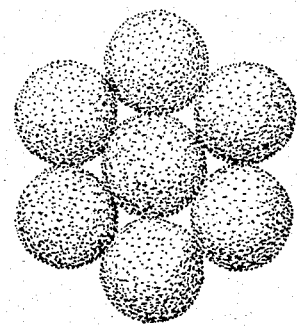
Fig. 3 is an enlarged view of a group of pelletized sugar particles explanatory of certain advantages of the invention.
Figure 4:
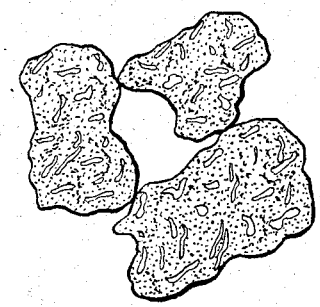
Fig. 4 is an enlarged view of a group of caked masses of transformed sugar particles or powdered sugar crystal fragments similar to those of Fig. 2.

The lower percentage of air space in the pellet of Fig. 1 compared with that of Fig. 2, reduces the tendency of the pellet to absorb moisture from the air. These advantages are even more pronounced when a group of the pellets is considered. For example, there is shown in Fig. 3 a group of pellets similar to that of Fig. 1, while Fig. 4 shows a mass of caked particles built up from the mass of Fig. 2. Fig. 4 may also be considered to represent a mass of caked powdered sugar prepared in the ordinary way. By reason of the substantially uniform spherical or rounded contours of the individual pellets of Fig. 3, the areas of contact between adjacent pellets are so small that the pellets do not cohere and there is a negligible chance of the pellets becoming fused or cemented together by reason of moisture absorption. However, when a mass of powdered sugar crystal fragments are in contact, as for example during shipping or handling, the individual components of the group by reason of their jagged surfaces, mechanically interlock, and sufficient areas of contact are provided so that the syrupy film firmly bonds the several groups resulting in hardening and caking as shown in Figs. 2 and 4. While it is possible by suitable force to decake the mass of Fig. 4 into its component aggregates such as shown in Fig. 2, any further disintegration is for practical purposes impossible. On the other hand, the mass of Fig. 3 is a free-flowing powder since the individual pellets can easily roll with respect to one another and the pellets can be individually disintegrated into their finer components by a suitable pressure. If these powdered components were shipped or handled in the ordinary condition, that is without being compacted and smoothly contoured, they would readily cake. Furthermore, because of their extreme fineness, there would always be the likelihood of a loss of sugar in dust form which dust is a constant source of annoyance to workmen and requires special sanitary precautions to prevent sugar mold, yeast formation and the like on the surfaces where it settles. These difficulties with the dust-like powdered sugar are avoided when it is prepared in the form shown in Figs. 1 and 3. The greater apparent density of a mass of pelletized powdered sugar in accordance with the invention, results in a reduction in the size of the shipping containers required for a given weight of sugar. As a result of the free-flowing character of the powdered sugar, the housewife can measure out small quantities, for example a teaspoonful with greater accuracy and less chance of spilling.

Up to the present time, no practical process has been proposed for preparing finely powdered sugar or similar products which are free-flowing and free from caking while retaining the original crystal form of the original powdered sugar.

It will be understood of course that the invention is not limited to any particular composition of the finely powdered sugar, thus soft or brown sugar and transformed sugar sometimes called amorphous sugar, well-known in the art, lend themselves particularly to conversion into the pelletized form shown in Figs. 1 and 3. Particularly should it be noted that soft or brown sugar, has a very pronounced tendency to become hard and caked when stored in a dry atmosphere for a short time. Notwithstanding the fine flavor of this type of sugar, its caking properties seriously limit its wide use. Transformed sugar will also cake, and while it is considerably less expensive to manufacture than granulated sugar, it is not as attractive or convenient to use because of its caking tendency. The present invention however extends the field of usefulness of both these kinds of sugar.

Figure 5:
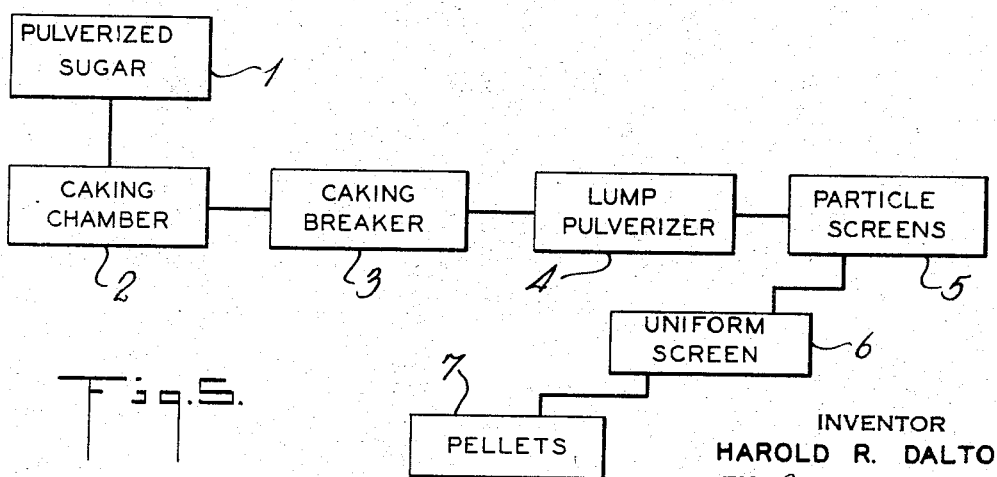

In the drawings, there are shown three alternative methods according to the invention. In the method shown diagrammatically in Fig. 5, the original finely pulverized or amorphous sugar is fed from chamber 1 into a closed caking chamber 2. The atmosphere in chamber 2 is maintained at a relative humidity of approximately 60% for a time determined primarily by the desired hardness of the particles of the caked mass. Thus, a particle of medium hardness was obtained by retaining the powdered sugar in the caking chamber for three days at 60% relative humidity and 68 degrees F. The caked mass was then removed and broken into small lumps in the device 3. The lumps are then passed through a pulverizer 4 such as any well-known form of disc pulverizer whereby the lumps are reduced to particles of the desired mesh. During the pulverizing step, the particles are agitated so as to render them somewhat round or otherwise smoothly contoured. These particles are then passed through successive screening stages 5 and 6 where they are further rounded to select a final range of sizes for passage to the receiving chamber 7. Preferably these final sizes are between 0.3 mm. and 1.5 mm. pellets such as shown in Figs. 1 and 3. In this method, it will be seen that the original powdered sugar is purposely converted to cake form wherein the particles are compacted by the caking action but without cooking or forming a syrupy batch which would otherwise change the type of sugar. Consequently, in the finished pellets the particles of each pellet are held together substantially entirely without cementation or fusion, and substantially entirely by cohesion.

In the method of Fig. 6, the finely pulverized sugar or transformed sugar, is fed from a chamber 8 into a hydraulic press 9, whereby it is compressed into large cakes or extruded from spinnerets of desired hardness. The caked sugar is then broken up into lumps in the decaker 10 which lumps are then fed to the pulverizer 11. The pulverized sugar is then subjected to successive screening stages 12, 13, and as a result the smoothly rounded pellets of the desired size are received in the chamber 14. A satisfactory product was thus obtained by subjecting the powdered sugar in press 9 to a pressure of 700 pounds per square inch, the amount of sugar at each pressing operation being regulated so as to result in a pressed cake of approximately $\frac{1}{32}$ inch thickness.

In the method illustrated in Figs. 7 and 8, the original finely powdered sugar is fed from a hopper 15 between two rotating drums or rollers 16, 17. Roller 17 is of metal and has its surface provided with a series of circumferential shallow grooves or flutings 18 into which the powdered sugar is compressed by roller 16, the rollers radiating in the direction indicated by the arrows. The flutings 18 are approximately $\frac{1}{32}$ inch deep and registering therewith is a serrated doctor blade 19, the teeth of which enter the flutings to strip the compressed sugar therefrom. This sugar falls through a suitable chute 20 into and through the successive screening stages 21, 22, the latter selecting the desired size pellets for passage to the chamber 23. It will be understood of course, that the pellets left on the various screens in any of the foregoing processes, are returned for reprocessing so that eventually the finished batch consists of pellets of substantially uniform diameter.

When the original sugar used in the processes of Figs. 5, 6, 7 and 8 is of the soft type, it is necessary first to submit this soft sugar to the action of a hydraulic press to squeeze out adhering syrup containing invert sugar and other hygroscopic substances responsible for the caking tendencies. The hydraulic pressure does not disturb the sugar crystals in any way except to remove the adhering syrup. The press cake thus formed can then be broken up and reduced to the spherical particles in the manner above described.

Various changes and modifications in the disclosed embodiments may be made herein, without departing from the spirit and scope of the invention. For example the pellets may be formed by a rolling impact such as by mechanically organizing and enlarging the crystals or fragments of crystals by rolling or tumbling them upon themselves.

What I claim is:

1. The method of converting powdered sugar which tends to cake when damp into a powdered sugar for use in fondants and the like and which is substantially free from caking and without change in the original crystal form of the powdered sugar, which comprises compacting the original powdered sugar without subjecting it to substantial wetting, and then subjecting the compacted mass to a pulverizing and screening process to form pellets having substantially uniform size and substantially rounded contours with the particles of each pellet retaining their original crystal form.

2. The method according to claim 1 in which the powdered sugar is compacted under sufficient force so that the finished pellets are of substantially uniform density and have a greater apparent density than an equivalent mass of the original powdered sugar.

3. The method according to claim 1 in which the original powdered product is subjected to a pressure of the order of 700 pounds per square inch.

4. The method of converting soft sugar to reduce its caking tendencies which comprises, subjecting the original sugar in pulverized form to hydraulic pressure to remove adhering syrup and to form a compact mass, pulverizing the mass and compacting it into small aggregates of the original crystal in the form of small spherical pellets which are readily redispersed mechanically into the original crystal form of the soft sugar but which pellets are compact enough to withstand normal shipping, storing and handling without redispersion, the compacted particles of each pellet being substantially free from fusion or cementitious bonding.

5. A substantially free-flowing powdered sugar suitable for use in icings, fondants and the like comprising, a powdered sugar the particles of which are approximately 25 microns or less in size, said particles being compacted to form substantially smoothly rounded pellets of about 0.3 mm. to 1.5 mm. average diameter wherein the particles are held together substantially entirely by mechanical cohesion and substantially free from fusion or cementation bonding.

6. The method of converting a powdered edible food product having an original crystalline form, which normally tends to cake and form a syrupy surface when substantially wet, into a pelletized product which is substantially free from caking and without changing said crystalline form, which method comprises compacting the original powdered material without subjecting it to any substantial wetting, and then subjecting the compacted mass to a pulverizing and screening process to form pellets having substantially uniform size and substantially rounded contours with the particles of each pellet retaining their original crystalline form.

HAROLD R. DALTON.